United States Patent [19]
Kim

[11] Patent Number: 5,606,364
[45] Date of Patent: Feb. 25, 1997

[54] SURVEILLANCE SYSTEM FOR PROCESSING A PLURALITY OF SIGNALS WITH A SINGLE PROCESSOR

[75] Inventor: Phil-nam Kim, Kyeongsangnam-do, Rep. of Korea

[73] Assignee: Samsung Aerospace Industries, Ltd., Kyeongsangnam-do, Rep. of Korea

[21] Appl. No.: 412,014

[22] Filed: Mar. 28, 1995

[30] Foreign Application Priority Data

Mar. 30, 1994 [KR] Rep. of Korea ............... 94-6548

[51] Int. Cl.⁶ ........................................... H04N 7/18
[52] U.S. Cl. .................................. 348/159; 348/705
[58] Field of Search ........................ 348/705, 150, 348/151, 153, 159, 372, 143; H04N 7/18

[56] References Cited

U.S. PATENT DOCUMENTS 3,852,735  12/1974  Matsuda et al. ............... 348/153
4,308,559  12/1981  Schiff ............................. 348/159
4,700,230  10/1987  Pshtissky et al. .............. 348/159
4,989,085   1/1991  Elberbaum ..................... 348/159
4,994,916   2/1991  Pshtissky et al. .............. 348/159
5,097,328   3/1992  Boyette .......................... 348/150
5,216,502   1/1993  Katz ............................... 348/150
5,335,014   8/1994  Elberbaum ..................... 348/159

FOREIGN PATENT DOCUMENTS 93-3104  3/1994  Rep. of Korea .

*Primary Examiner*—Victor P. Kostak
*Attorney, Agent, or Firm*—Finnegan, Henderson, Farabow, Garrett & Dunner, L.L.P.

[57] ABSTRACT

A system for processing a plurality of image signals which can reproduce an initial image by processing one or more image signals by a single image processor when a plurality of image signals are processed using one or more video cameras. The system for processing a plurality of image signals includes a power supply, a signal input block including one or more image signal input block, a switch block, a signal converter, a microcontroller and an image processor.

8 Claims, 2 Drawing Sheets

SURVEILLANCE SYSTEM FOR PROCESSING A PLURALITY OF SIGNALS WITH A SINGLE PROCESSOR

BACKGROUND OF THE INVENTION

A. Field of the Invention

The present invention relates generally to a system for processing a plurality of image signals, and more particularly to a system for processing a plurality of image signals, which can reproduce an initial image by processing one or more image signals with a single image processor when a plurality of image signals must be processed from one or more video cameras.

B. Description of Related Art

A conventional video camera is basically a charge coupled device (CCD) camera using a charge coupled device. The CCD camera is a machine which transforms an image signal inputted through a charge coupled device, that is, a solid image pickup device, into an electrical signal and reproduces a image corresponding to the inputted image signal.

The CCD camera is often employed in a bank or a large department store as a supervisory camera for security purposes and peace preservation. In recent times, the CCD camera has also been employed in individual homes as an identifying camera for security and peace preservation.

Conventionally, when CCD cameras are disposed in various positions in the location of use, e.g., a bank, and are used to monitor customers for the preservation of the public peace, the individual CCD cameras are positioned at a variety of desired positions throughout the location of use. These CCD cameras in turn reproduce images from the desired positions on a monitor.

This thereby allows for the monitoring of the customers by disposing the CCD cameras throughout the location of a use. Each individual CCD camera includes a signal input block for inputting an image signal, an image processor for processing the signal inputted from the signal input block and a power supply for supplying power to each block of the CCD cameras.

Accordingly, in order to control one or more CCD cameras, microcontrollers for controlling each camera of the one or more cameras are connected in parallel by one or more communication channels, and the microcontrollers transmit operation control signals to the cameras through the corresponding communication channels.

Accordingly, in order to control one or more CCD cameras, microcontrollers for controlling each camera of the one or more cameras are connected in parallel by one or more communication channels, and the microcontrollers transmit control signals to the cameras are operated through the corresponding communication channels.

However, a separate communication channel for controlling each of the one or more cameras is required. This increases the cost of manufacture in the conventional art because a plurality of cameras are controlled in parallel.

To overcome the above disadvantage, Korean Patent Appln No. 93-3104 filed on Mar. 3, 1993 entitled "CONTROL SYSTEM FOR CONTROLLING A CAMERA AND METHOD THEREOF" has proposed a technique which can control a plurality of CCD cameras by a single transmitter by transmitting serially a control signal to control a zooming operation and focusing operation of a plurality of CCD cameras. This prevents an increase in communication channels for controlling a plurality of CCD cameras and reduces the cost of manufacture.

However, Korean Patent Appln No. 93-3104 has the disadvantage that the cost of installation rises as the number of the CCD cameras increases because each individual CCD camera includes an image signal input block and an image signal processor for processing the inputted image signal to be processed. These individual CCD cameras are installed respectively throughout the area to be monitored, and the images they capture are reproduced when one or more of the images from the CCD cameras are processed.

In addition, it has another disadvantage of not providing a compact CCD camera because the CCD cameras disposed in a place to be supervised must include the signal input block, the signal processor, and the power supply.

SUMMARY OF THE INVENTION

The object of the present invention is to overcome the problems and disadvantages of the conventional system. To achieve this and other objects, the system for processing a plurality of image signals of the present invention, as embodied and broadly described herein, includes a plurality of input means, each for producing an output signal corresponding to a respective one of said image signals; means, coupled to the input means, for selecting at least one of the output signals; and means, coupled to the input means, for producing a data signal corresponding to a selected output signal.

According to another aspect of the present invention, the system for processing a plurality of image signals includes a power supply for supplying or cutting off power; one or more image signal input means for accepting as inputs the image signals and producing as outputs signals corresponding to the image signals; a switch connected to the power supply and to each of the one or more image signal input means for transmitting image signals produced from each of the one or more image signal input means; means for converting the image signal produced from the one or more image signal input means into a digital signal and producing the digital signal; first producing means for producing a signal for reproducing the inputted image signal into an initial image when the image signal is inputted through the switch after activating one of the one of image signal input means and connecting it to the first producing means; and means for processing the image signal into an image data reproducible to the initial image after receiving the image signal produced from the one or more image signal input means according to the signal produced from the converting means.

The objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one embodiment of the invention and together with the description, serve to explain the principles of the invention.

DESCRIPTION OF A PREFERRED EMBODIMENT

Reference will now be made in detail to a preferred embodiment of the invention, an example of which is illustrated in the accompanying drawings.

Figure 2:
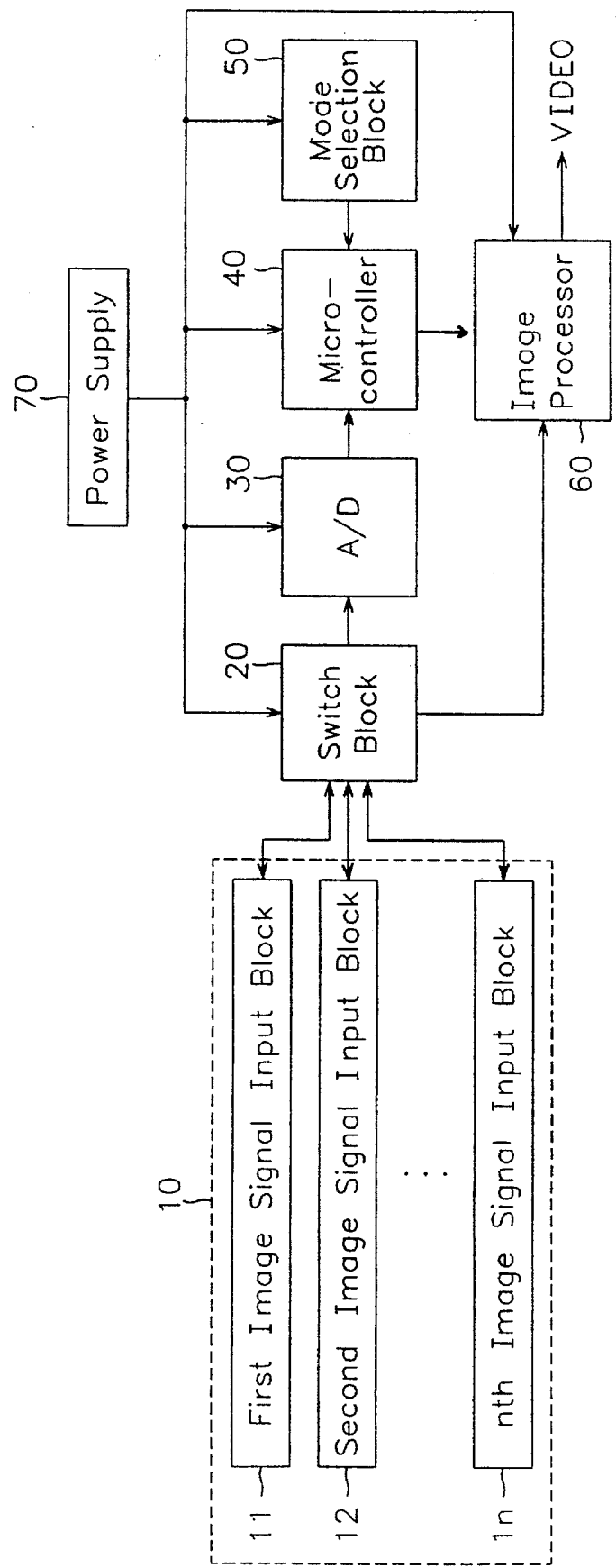
FIG. 2 is a schematic illustration of a system for processing a plurality of image signals according to a preferred embodiment of the present invention.

Referring to FIG. 2, the system for processing a plurality of image signals includes an image signal input block 10 having a plurality of N individual image signal input blocks 11 to 1n, a switch block 20 connected to an output terminal of the image signal input block 10, a signal converter 30 connected to an output terminal of the switch block 20, a microcontroller 40 connected to an output terminal of the signal converter 20, a mode selection block 50 connected to an input terminal of the microcontroller 40, an image processor 60 connected to output terminals of the microcontroller 40 and the switch block 20, and a power supply 70 for supplying power to each block 10, 30, 40, 50 and 60.

The operation of the system of the present invention, as embodied herein, is as follows.

Figure 1:
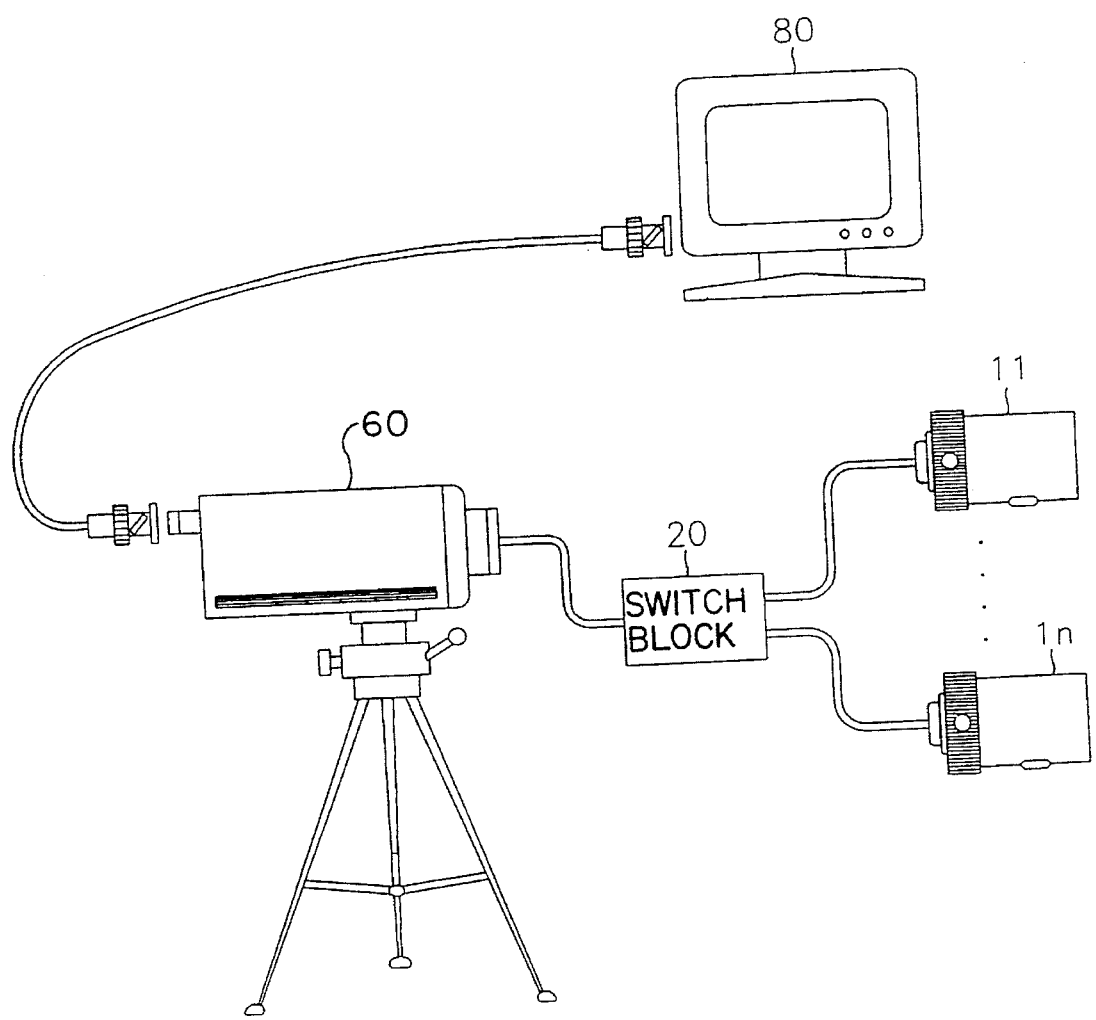
FIG. 1 is a view showing a concept of a system for processing a plurality of image signals according to a preferred embodiment of the present invention.

A plurality of photographic lenses (not shown) for inputting an image signal, a plurality of solid image pickup devices (not shown) for producing an electrical signal corresponding to the image signal inputted through a photographic lens, and a plurality of image signal input blocks 11 to 1n, including a driving block for activating the solid image pickup device, are disposed at places to be monitored by a video camera as shown in FIG. 1.

To process the image signals inputted from the image signal input blocks 11 to 1n disposed at each place, the power supply 70 supplies power to each block. To activate each image signal input block 11 to 1n, the power supply 70 supplies power to the image pickup device driving block (not shown) in each image signal input block 11 to 1n through the switch block 20.

When power is supplied to each of blocks 30, 40, 50 and 70, and to the image pickup device driving block (not shown) of each image signal input block 11 to 1n, the image pickup device driving block in each image signal input block 11 to 1n is activated, and the solid image pickup device produces an electrical signal corresponding to the image signal inputted through a lens (not shown).

The user may select a manual mode through a mode selection block 50 in which a chosen one of the individual image signal input blocks 11 to 1n in the image signal input block 10 are reproduced on a monitor. Similarly, the user may select an automatic mode in which the images corresponding image signal input blocks 11 to 1n are automatically reproduced on the monitor in a previously set order.

When the user selects the desired mode, the mode selection block 50 produces a signal corresponding to the selected mode to the microcontroller 40. If the automatic mode is selected by the mode selection block 50, the microcontroller 40 activates sequentially the switches in the switch block 20 connected to each image signal input block 11 to 1n in the previously set order.

Accordingly, the image signal produced from each image signal input block 11 to 1n is sequentially inputted according to the connection of the switches.

When the manual mode is selected through the mode selected block 50, the microcontroller 40 reads the image signal input block 11 to 1n set in response to the selection of the user. After reading the image signal input blocks 11 to 1n corresponding to the selection of the user, the microcontroller 40 activates the switch block 20, activates the switch connecting the previously set image signal input blocks 11 to 1n and inputs the image signal produced from the previously set image signal input blocks 11 to 1n.

When the image signal produced from each image signal input block 11 to 1n is inputted to a signal converter 30 through the switch block 20, the signal converter 30 converts an analog image signal into a digital signal that may be processed by a computer and produces the digital signal to the microcontroller 40.

At this time, the image signal inputted through the switch block 20 is also inputted to an image processor 60.

When the image signal is inputted, the microcontroller 40 activates the image processor 60 to reproduce the image signal into an initial image on the monitor. If the signal to be produced from the microcontroller 40, the image processor 60 processes the image signal inputted through the set image signal input blocks 11 to 1n to an image data for being reproduced to the initial image and transmits the image data to the monitor in response to the signal from the microcontroller 40.

Referring to FIG. 1, the image data produced from the image processor 60 is reproduced as an image on the monitor 80, such that a viewer can perceive the image.

As described above, the system of the present invention has an advantage in that additional video cameras do not need to be disposed at the different places to be monitored, respectively when a plurality of image signals must be processed, because a plurality of image signals can be reproduced into the initial image by only a single image processor, resulting in significant cost savings and reduction of installation area. Furthermore, since the image signals are inputted through each image signal input block and are processed by only a signal image processor, making the entire system is compact.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A system for processing a plurality of image signals, comprising:

a power supply for supplying or cutting off power;

a plurality of image signal input means for accepting as inputs the image signals and producing output signals corresponding to the image signals, the output signals being incompatible with display by a video monitor;

a switch connected to the power supply and to the plurality of image signal input means for transmitting the output signals from the plurality of image signal input means and for transmitting power received from the power supply to the image signal input means;

converting means for converting the output signals from the switch into a digital signal;

control means for outputting a control signal to control reproduction of the digital signal into an initial image signal corresponding to the image signal input to one of said plurality of image signal input means; and means for processing the digital signal, according to the control signal, into image data reproducible by a video monitor to the initial image.

2. The system of claim 1, further comprising producing means for producing a corresponding signal if a user selects a manual mode by which the user can select voluntarily one of the plurality of image signal input means or an automatic mode by which the plurality of image signal input means are automatically selected in a previously set order.

3. The system of claim 2, wherein the control means determines which of the image signal input means is selected by the user and activates the switch to connect the selected image signal input means when a corresponding signal to the manual mode is produced from the producing means, and activates the switch to connect to the plurality of image signal input means in the previously set order when a corresponding signal to the automatic mode is produced.

4. The system of claim 1, wherein the power supply, converting means, first control means, and processing means are installed in a single machine, such that the plurality of image signal input means share the single machine.

5. A system for processing a plurality of image signals, comprising:

a plurality of input means, each for producing an output signal corresponding to a respective one of the image signals;

selecting means, coupled to the input means, for selecting at least one of the output signals;

means, coupled to the selecting means, for producing a data signal corresponding to a selected output signal;

said selecting means further including means for activating one of the input means corresponding to the selected output signal and means for coupling the activated input means to the data signal producing means to produce a data signal corresponding to the selected output signal.

6. The system for processing a plurality of image signals of claim 5, wherein the selecting means includes means for indicating one of the input means manually selected by an user of the system and means for selecting the output signal corresponding to the selected one of the indicated input means.

7. The system for processing a plurality of image signals of claim 5, wherein the selecting means includes means for automatically selecting each of the output signals in a predetermined sequence.

8. An image processing system comprising:

an image processing machine;

a plurality of image signal input means, each for accepting an image signal as an input and producing an output signal corresponding to the image signal, the output signal being incompatible with display on a video monitor;

a switch connected to the plurality of image signal input means for selectively transmitting the output signals to the image processing machine;

the image processing machine including:
means for converting the selected output signals into digital signals;
means for processing the digitally converted signals and for outputting a control signal; and means for processing the selected output signals, based on the control signal, into signals suitable for display on a video monitor; and a power supply for supplying power to the image processing machine and the switch, the image signal input means receiving power transmitted through the switch from the power supply means.

\* \* \* \* \*